Patented Sept. 5, 1922.

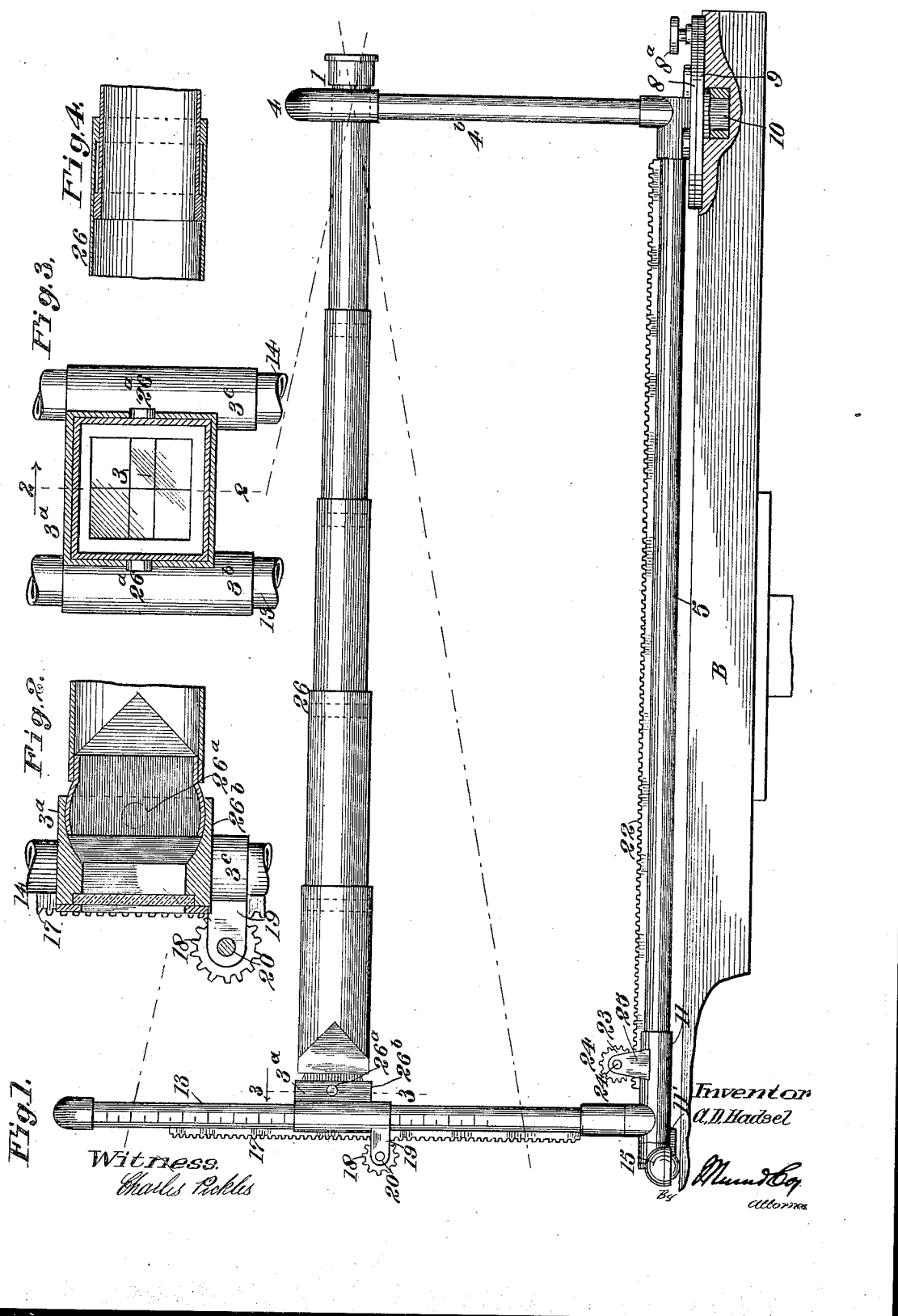

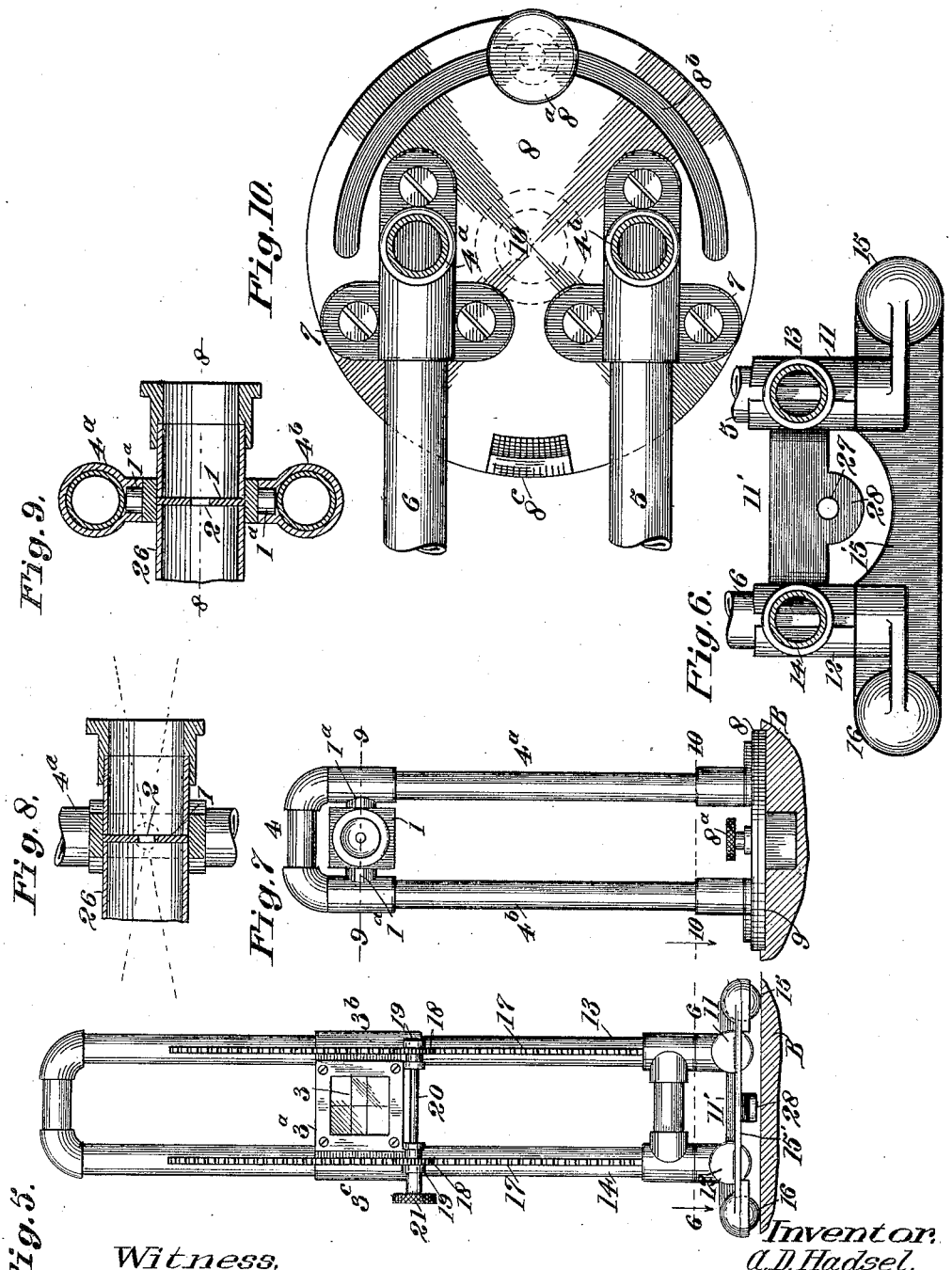

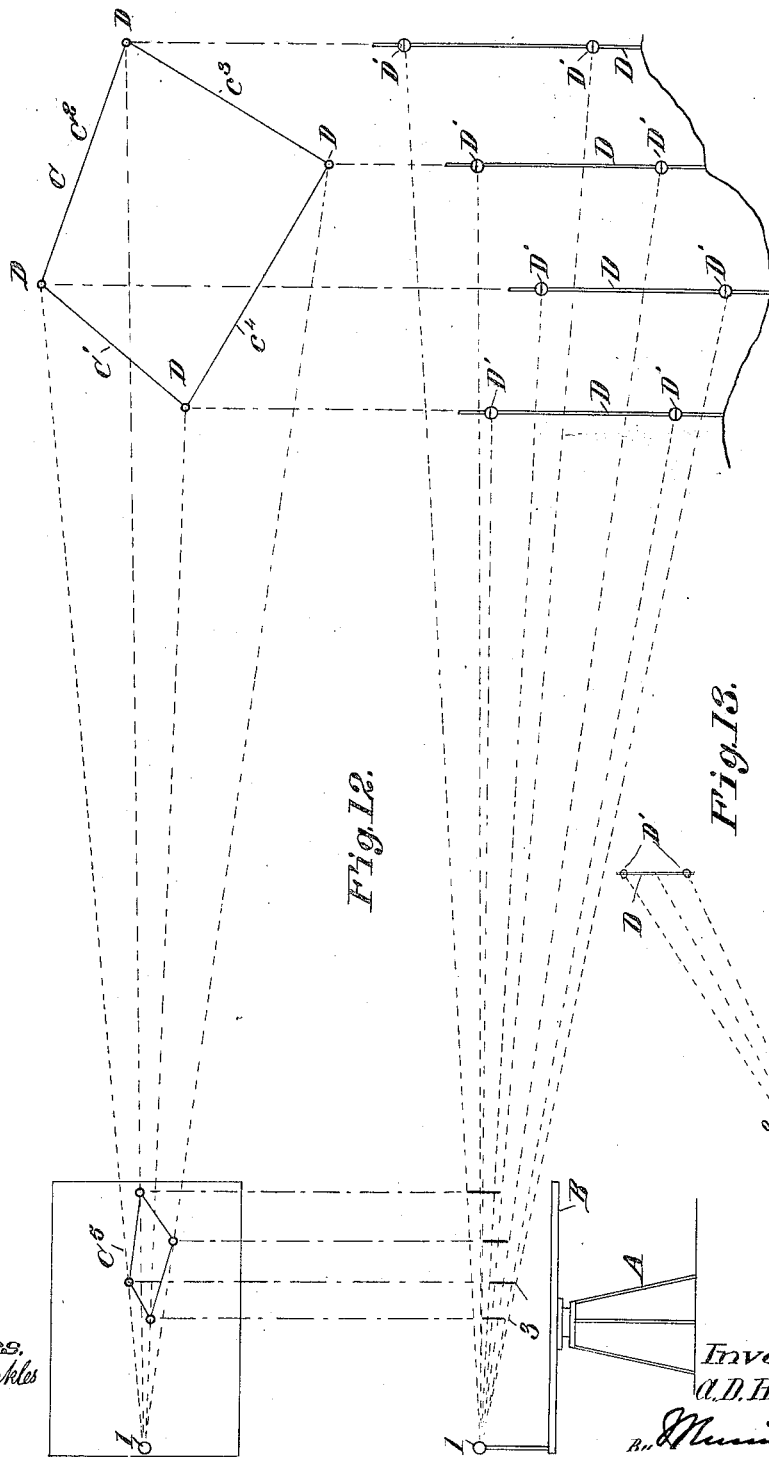

1,428,028

UNITED STATES PATENT OFFICE.

ALVAH D. HADSEL, OF IOWA HILL, CALIFORNIA, ASSIGNOR OF ONE-HALF TO FREDERICK N. WOODS, JR., OF SAN FRANCISCO, CALIFORNIA.

SURVEYING INSTRUMENT.

Application filed December 27, 1920. Serial No. 433,381.

*To all whom it may concern:*

Be it known that I, ALVAH D. HADSEL, a citizen of the United States, a resident of Iowa Hill, county of Placer, and State of California, have invented a new and useful Surveying Instrument, of which the following is a specification.

My invention while relating in general to surveying instruments has reference more particularly to an instrument for making stadia surveys.

The primary object of the invention is to provide an instrument for actually plotting various positions of stadia rods on the plane table without the inconvenience of mathematical calculations.

In the accompanying drawings I have selected an illustrative embodiment of the invention as an example of reducing the same to practice.

In said drawings:—

Figure 1 is a side elevation of the instrument as supported upon the plane table;

Figure 2 is a cross section on the line 2—2 Figure 3;

Figure 3 is a cross section on the line 3—3 Figure 1;

Figure 4 is a detail sectional view of the telescope;

Figure 5 is a front elevation of the standard for mounting the cross hair carriage;

Figure 6 is a horizontal section on the line 6—6 Figure 5;

Figure 7 is a rear elevation of the standard for supporting the eye piece;

Figure 8 is a sectional view on the line 8—8 Figure 9;

Figure 9 is a sectional view on the line 9—9 Figure 7;

Figure 10 is a sectional view on the line 10—10 Figure 7 and showing the revolving anchor plate in plan;

Figure 11 is a schematic view in plan of an example of using the instrument;

Figure 12 is a schematic view in side elevation of an example of using the instrument; and Figure 13 is a schematic view showing the relation between vertical and horizontal measurements.

Referring to the drawings in detail:

The instrument is best adapted for use in combination with a more or less conventional type of tripod (A) and plane table (B) the latter being supported upon the former in a horizontal plane and with the instrument mounted upon the table.

As heretofore practiced in taking stadia measurement it has been necessary to calculate the horizontal position of the stadia rod in the field by triangulation. According to the present invention these calculations are eliminated in that the same result is obtained mechanically by the instrument itself, and the same is true regardless of any vertical angle with which it may become necessary to treat.

In so far as concerns the illustrative example shown, the instrument embodies as its principal elements or parts an eye piece (1) containing a peep hole (2) and cross hairs (3), the eye piece (1) being maintained always in a fixed vertical and horizontal plane to the entire field of operation including the plot and the area being surveyed. To effect this fixed position of the eye piece the same is mounted upon a standard (4) which may comprise a pair of parallel uprights (4$^a$) and (4$^b$) between which the eye piece is pivoted by the trunnions (1$^a$) so that the same is free to be rotated in a vertical plane, the peep hole (2) being arranged concentric of the pivot to realize the fixed vertical and horizontal plane to the entire field of operation above mentioned. The parallel uprights (4$^a$) and (4$^b$) are rigidly fixed as a component part of a pair of horizontal parallel guides (5) and (6) which support them with the guides and the uprights thus joined fixed by cleats (7) or other suitable means to a revolving anchor plate (8) which in turn is concentrically pivoted with freedom of rotation in superimposed relation upon a bearing plate (9). The plate (9) is likewise concentrically fixed to the plane table (B) by a plug or the like (10).

The horizontal guides (5) and (6) extend across the table and terminate in telescoping relation with sleeves or the like (11) and (12) which are a fixed part of the standards (13) and (14) for the cross hairs (3). The sleeves (11) and (12) include suitable feet or skids (15) and (16) which are so positioned to support the standards in a fixed perpendicular position which is necessarily required for accuracy.

The parallel standards (13) and (14)

provide a support and mounting for the cross hairs (3) which includes a suitable carriage (3ª) confined between the standards by the sleeves (3ᵇ) and (3ᶜ) with the sleeves adapted to slide up and down on the standards carrying with them the cross hairs carriage for adjusting or regulating the vertical position of the cross hairs.

To effect a movement of the carriage (3ª) a rack (17) or the like is arranged on the front face of each of the standards (13) and (14) with pinions (18) mounted in front of the carriage by the short arms (19) and with the pinions connected by a pintle (20) to which they are fixed and with a thumb button (21) on one end of the pintle so that by turning the button clockwise the rotation of the pinions will co-act with the racks to lower the carriage or by turning the button anti-clockwise the carriage may be raised.

The above description will clearly disclose the raising and lowering of the cross hairs for vertical adjustments.

To realize the horizontal adjustment of the cross hairs the telescoping feature of the guides (5) and (6) in the sleeves (11) and (12) may be used and as a convenient means of actuating the same each of the guides may include a rack (22) on its upper surface with pinions (23) meshing therewith and connected by a pintle (24) which is mounted in the upright ears (25) which in turn, are carried by the sleeves (11) and (12). A thumb button or the like (not shown) may be employed for actuating the pinions substantially the same as in the means for raising or lowering the cross hairs.

A suitable telescope (26) connects the cross hairs (3) with the eye piece (1) for confining the operator's vision. This telescope is made in telescoping sections to compensate for the horizontal adjustment of cross hairs and the end section thereof which is connected to the carriage (3ª) is pivoted as at (26ª) with a flexible joint made with a collar extension (26ᵇ) on the side of the carriage. The opposite end section of the telescope is fixed to the eye piece (1) and with the pivot of the eye piece enabling vertical movement of the same.

The skids or feet (15) and (16) are braced by the cross piece (15′) and the sleeves (11) and (12) are properly braced by a cross piece (11′) to which is fixed a forwardly projecting location indicator (27) which preferably comprises a disc-like member positioned parallel to the plane table and with an opening (28) therein positioned exactly in line with the vertical one of the cross hairs. The revolving anchor plate (8) while permitting the forward part of the instrument, including the cross hairs, to be moved across the face of the plane table, as well as to enable the horizontal adjustment to be obtained, anchors the eye piece in one fixed position.

To hold any desired radial position of the cross hairs the plate (8) includes a clamping screw (8ª) with a slot (8ᵇ) in the plate in which the screw is set. The plate (8) and the plate (9) are provided with a vernier (8ᶜ) for indicating radial angles.

Arranged on both sides of the standards (13) and (14) is a graduated scale with the edge of the sleeves (3ᵇ) and (3ᶜ) which encircle the standards adapted to co-operate with the same to indicate the elevation of the rod.

Operation: To lay out a plot of an area to be surveyed the tripod (A) is set up at any convenient location with the table (B) supported thereon and with the instrument positioned upon the table and anchored as previously stated. As layed out in Figures 11 and 12, (C) represents the outline of a given irregular area to be surveyed which is bounded by the imaginary lines (C¹) (C²) (C³) and (C⁴). The stadia rod (D) will first be placed at any one of the corners of the area and the instrument moved radially about its pivot (10) on the table until the vertical one of the cross hairs (3) is in alignment with the rod and the peep hole of the eye piece, which indicates the direction of the rod on the plot which is of course positioned upon the table beneath the instrument. To indicate the distance of the rod (D) from the pivot point (10) of the instrument, the supporting standard for the cross hairs is horizontally adjusted until the space between the horizontal stadia hairs intersects with the two spaced targets (D′) on the rod. A vertical adjustment of the cross hairs is changed to correspond to the elevation of the targets on the rod. As soon as these adjustments and findings have been made the position or location of the rod (D) in the area being surveyed is indicated on the plot by a pencil dot made by inserting a pencil through the opening (28) in the indicator (27). In case it is desired to note the elevation of the rod the same is read by the graduations on the sides of the cross hairs standards. To complete the survey the rod (D) is carried successively to the other corners and the operation or manipulation of the instrument repeated as in the first reading. As will be seen from Figure 11 the completed plot is an exact reproduction, on a smaller scale of the surveyed area. The scale of the plot coincides to the space relation of the targets (D′) on the rod and to change the scale of the plot either larger or smaller, the targets are set either farther apart or nearer to one another.

It is to be noted that as shown in Figure 12 the eye piece (1) remains in one position with the distance and elevation of the cross hairs relative to the eye piece changed according to horizontal or vertical positions of the rod as indicated by the heavy perpendicular lines. The diagram shown in Figure 13 is intended to illustrate the relation between the horizontal and vertical angular measurements.

I claim:

1. A surveying instrument including a frame having upright members longitudinally adjustable means for spacing said upright members apart, an eye piece fixed in a vertical and horizontal plane on one of said upright members of the frame, and stadia hairs on the opposite upright member of the frame with means for adjusting their position both horizontally and vertically with respect to the eye piece, said frame having a fixed pivot about which it may be moved in a horizontal plane, whereby stadia measurements may be made from a stadia rod with the instrument indicating on a plot the horizontal direction and distance of said rod.

2. A surveying instrument including a frame having upright members, longitudinally adjustable means for spacing said upright members apart, an eye piece fixed in a vertical and horizontal plane on one of said upright members of the frame, and stadia hairs on the opposite upright member of the frame with means for adjusting their position both horizontally and vertically with respect to the eye piece, said frame having a fixed pivot about which it may be moved in a horizontal plane, whereby stadia measurements may be made from a stadia rod with the instrument indicating on a plot the horizontal direction and distance of said rod, and means for also indicating the elevation of said rod.

3. A surveying instrument including a frame having upright members, longitudinally adjustable means for spacing said upright members apart, an eye piece fixed in a vertical and horizontal plane on one of said upright members of the frame, and stadia hairs on the opposite upright member of the frame with means for adjusting their position both horizontally and vertically with respect to the eye piece, said frame having a fixed pivot about which it may be moved in a horizontal plane, whereby stadia measurements may be made from a stadia rod with the instrument indicating on a plot the horizontal direction and distance of said rod, and means for also indicating the elevation of said rod, comprising graduations on the upright member of the frame carrying the stadia hairs, and with the carriage for the stadia hairs co-operating with said graduations substantially as described.

4. A surveying instrument including a frame having upright members, longitudinally adjustable means for spacing said upright members apart, an eye piece fixed in a vertical and horizontal plane on one of said upright members of the frame, and stadia hairs on the opposite upright member of the frame with means for adjusting their position both horizontally and vertically with respect to the eye piece, said frame having a fixed pivot about which it may be moved in a horizontal plane, and with a location indicator carried by its free end; whereby stadia measurements may be made from a stadia rod with the instrument indicating on a plot the horizontal direction and distance of said rod.

5. A surveying instrument including an eye piece, means for mounting the eye piece in a fixed vertical and horizontal plane stadia hairs, means for mounting the stadia hairs in horizontally and vertically adjustable spaced relation relative to the eye piece, a location indicating means adjacent the mounting for the stadia hairs, and a fixed pivot for the instrument around which it may be moved in a horizontal plane substantially as described.

6. A surveying instrument including a frame having upright members, longitudinally adjustable means for spacing said upright members apart, an eye piece fixed in a vertical and horizontal plane on one of said upright members of the frame, and stadia hairs on the opposite upright member of the frame with means for adjusting their position both horizontally and vertically with respect to the eye piece, means on the mounting for the stadia hairs for indicating elevations, and said frame having a fixed pivot about which it may be moved in a horizontal plane, with a location indicator carried by its free end; whereby stadia measurements may be made from a stadia rod with the instrument indicating on a plot the horizontal direction and distance of said rod.

7. In a surveying instrument and in combination with a plotting table, an eye piece supported above the plotting table in a fixed plane, stadia hairs on the instrument supported over the plotting table in spaced relation relative to the eye piece, and adjustable in both a horizontal and vertical plane relative to both the eye piece and the plotting table, said instrument having a fixed pivot on the plotting table around which it may be moved in a horizontal plane, and a location indicator on the instrument below the stadia hairs and in vertical alinement with the vertical one of the stadia hairs.

8. In a surveying instrument and in combination with a plotting table, an eye piece supported above the plotting table in a fixed plane, stadia hairs on the instrument supported over the plotting table in spaced relation relative to the eye piece, and adjustable in both a horizontal and vertical plane relative to both the eye piece and the plotting table, said instrument having a fixed pivot on the plotting table around which it may be moved in a horizontal plane, a location indicator on the instrument below the stadia hairs and in vertical alinement with the vertical one of the stadia hairs, and elevation indicating means operatively associated with the stadia hairs.

9. A surveying instrument as set forth in claim 8 and in combination with a stadia rod having a plurality of targets adjustable upon the rod to determine the scale of measurements indicated by said instrument.

ALVAH D. HADSEL.